United States Patent
Muraoka et al.

(10) Patent No.: US 8,189,813 B2
(45) Date of Patent: May 29, 2012

(54) AUDIO SYSTEM AND METHOD FOR EFFECTIVELY REPRODUCING SOUND IN ACCORDANCE WITH THE DISTANCE BETWEEN A SOURCE AND A POSITION WHERE THE SOUND IS HEARD IN VIRTUAL SPACE

(75) Inventors: Kazuki Muraoka, Tokyo (JP); Ryoji Makimura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 900 days.

(21) Appl. No.: 12/294,736

(22) PCT Filed: Mar. 22, 2007

(86) PCT No.: PCT/JP2007/055912
§ 371 (c)(1), (2), (4) Date: Sep. 26, 2008

(87) PCT Pub. No.: WO2007/111224
PCT Pub. Date: Oct. 4, 2007

(65) Prior Publication Data
US 2010/0260355 A1 Oct. 14, 2010

(30) Foreign Application Priority Data
Mar. 27, 2006 (JP) .................. 2006-085123

(51) Int. Cl.
*H03G 3/00* (2006.01)
(52) U.S. Cl. ........ 381/107; 381/104; 381/105; 381/106; 463/30; 463/31; 463/32; 463/34; 704/500
(58) Field of Classification Search ............... 463/30–35
See application file for complete search history.

(56) References Cited

U.S. PATENT DOCUMENTS
2001/0023202 A1* 9/2001 Okubo ............................ 463/35

FOREIGN PATENT DOCUMENTS

| EP | 1413340 A | 4/2004 |
|---|---|---|
| JP | 11347250 A | 12/1999 |
| JP | 2004-242728 A | 9/2004 |
| JP | 2004-351229 A | 12/2004 |
| JP | 2005-046270 A | 2/2005 |
| JP | 2005-046282 A | 2/2005 |
| JP | 2005-192878 A | 7/2005 |

OTHER PUBLICATIONS

International Search Report PCT/JP2007/055912 dated Apr. 17, 2007.
Supplementary European Search Report EP07739355 dated Jul. 15, 2009, 8 pages.

* cited by examiner

*Primary Examiner* — Fernando L Toledo
*Assistant Examiner* — Mark A Laurenzi
(74) *Attorney, Agent, or Firm* — Howard & Howard Attorneys PLLC

(57) ABSTRACT

In a sound processing apparatus, a storage unit stores, for example, a distance range in which sound uttered from a sound source is varied as information showing an area associated with the sound source. A determination unit determines the distance between the sound source and an attended point which is a position in which the sound uttered from the sound source is heard, and determines whether or not the attended point is in the distance range stored in the storage unit. A varying unit varies the sound when the attended point is in the distance range. A reproducing unit reproduces the sound varied by the varying unit.

9 Claims, 12 Drawing Sheets

FIG.4A

| SOUND TO BE UTTERED | DISTANCE RANGE FOR REPRODUCTION OF SOUND (METER [m]) |
|---|---|
| ENGINE SOUND OF VEHICLE | 0～100 |
| SOUND OF FALLING OF CARTRIDGE | 0～5 |
| ... | ... |

FIG.4B

| SOUND DATA TO BE UTTERED | DISTANCE RANGE FOR REPRODUCTION OF SOUND (METER [m]) |
|---|---|
| onsei01.wav | 0～100 |
| onsei02.wav | 0～5 |
| ... | ... |

FIG.4C

| SOUND DATA TO BE UTTERED | DISTANCE RANGE FOR REPRODUCTION OF SOUND (METER [m]) |
|---|---|
| onsei03.wav | 0～Linf |
| ... | ... |

FIG.9A

| SOUND TO BE UTTERED | DISTANCE RANGE FOR VARYING SOUND (METER [m]) |
|---|---|
| ENGINE SOUND OF VEHICLE | 0~100 |
| SOUND OF FALLING OF CARTRIDGE | 0~5 |
| ... | ... |

FIG.9B

| SOUND DATA TO BE UTTERED | DISTANCE RANGE FOR VARYING SOUND (METER [m]) |
|---|---|
| onsei01.wav | 0~100 |
| onsei02.wav | 0~5 |
| ... | ... |

FIG.11A

| SET INFORMATION | COMBINATION OF CHARACTER OBJECT |
|---|---|
| 1 | OBJ(2), OBJ(3) |
| 2 | OBJ(i), ..., OBJ(x) |
| ... | ... |

FIG.11B

| SOUND TO BE UTTERED | REFERENCE DISTANCE | MINIMUM VOLUME |
|---|---|---|
| SOUND OF OBJ(1) | $D1 \leqq D$ | $V1$ |
| SOUND OF OBJ(2) | $D2min \leqq D \leqq D2max$ | $V2$ |
| SOUND OF OBJ(3) | | |
| ... | ... | ... |
| SOUND OF OBJ(i) | $Dimin \leqq D \leqq Dimax$ | $Vi$ |
| ... | | |
| SOUND OF OBJ(x) | | |
| ... | ... | ... |

FIG.12A

| SOUND TO BE UTTERED | DISTANCE RANGE FOR REPRODUCTION OF SOUND (METER [m]) | FLAG |
|---|---|---|
| ENGINE SOUND OF VEHICLE | 0~100 | 0 |
| SOUND OF FALLING OF CARTRIDGE | 0~5 | 1 |
| ... | ... | ... |

FIG.12B

| SOUND DATA TO BE UTTERED | DISTANCE RANGE FOR REPRODUCTION OF SOUND (METER [m]) | FLAG |
|---|---|---|
| onsei01.wav | 0~100 | 0 |
| onsei02.wav | 0~5 | 1 |
| ... | ... | ... |

FIG.12C

| SOUND DATA TO BE UTTERED | DISTANCE RANGE FOR REPRODUCTION OF SOUND (METER [m]) | FLAG |
|---|---|---|
| onsei03.wav | 0~Linf | 0 |
| ... | ... | ... |

AUDIO SYSTEM AND METHOD FOR EFFECTIVELY REPRODUCING SOUND IN ACCORDANCE WITH THE DISTANCE BETWEEN A SOURCE AND A POSITION WHERE THE SOUND IS HEARD IN VIRTUAL SPACE

TECHNICAL FIELD

The present invention relates to a sound processing apparatus, sound processing method, information recording medium, and program suitable for effectively reproducing sounds in accordance with a distance between a sound source and a position where sounds are heard in virtual space.

BACKGROUND ART

A simulation game is well known in which a view point is placed in a given position in virtual space and a virtual image seen from the view point is synthesized and displayed. In such a game, by placing an object in virtual space and displaying a virtual image of the object from the view point based on the distance between the view point and the object, on a direction from the view point, etc., reality is provided as if a user were in the virtual space. One of contrivances to enhance reality in a game is the use of sound effects for which various contrivances is provided. For example, a game device is disclosed in Patent Literature 1 in which sound being heard in a position of a virtual camera is reproduced by changing a mixing ratio of different two pieces of sound data according to the distance between a source of an effect sound and the virtual camera. According to this game device, by increasing a ratio of sound data for near distance for sound reproduction when the distance between the sound source and virtual camera is small, it is made possible to output an effect sound that can provide more reality.

Patent Literature 1: Unexamined Japanese Patent Application KOKAI Publication No. 2005-046270.

DISCLOSURE OF INVENTION

Problem to be Solved by the Invention

By the way, in a sound processing apparatus, there is a hardware or software limitation in the number of effect sounds (the number of reproducing tracks) or the like that can be reproduced at the same time. On the other hand, in the case of a conventional sound processing apparatus, control is generally exercised so that volume of effect sound to be reproduced is lowered as the distance between a sound source of the effect sound and a position where the effect sound is heard is made larger. In many cases, the reproduction of the effect sound is continued until reaching the distance at which the volume of the effect sound is zero. As a result, there were some cases in which, even when the effect sound was reproduced with the volume of the effect sound lowered to a degree to which the effect sound was not heard substantially by a user, reproducing tracks are occupied due to the reproduction of the effect sound and, therefore, when the number of sounds to be reproduced at the same time is increased, other effect sounds to be originally reproduced at a high-volume level can not be correctly reproduced. Moreover, in a case where the effect sound has to be heard by a user from the point of view of staging effect even if the distance between a sound source and a position where the effect sound is heard is sufficiently large, special control of reproduction of the effect sound is required, which is cumbersome.

The present invention is to solve problems as above and it is an object of the present invention to provide a sound processing apparatus, sound processing method, information recording medium, and program thereof being suitably used for effectively reproducing sound in accordance with the distance between a sound source and a position where the sound is heard in virtual space.

Means for Solving the Problems

To achieve the above object, the following invention will be disclosed according to the principle of the present invention.

A sound processing apparatus according to a first aspect of the present invention comprises a storage unit, a determination unit, a varying unit, and a reproducing unit.

The storage unit stores an area associated with a sound source placed in virtual space.

The determination unit determines whether or not an attended point placed in the virtual space is contained in the area stored in the storage unit.

The varying unit varies sound to be uttered from the sound source in accordance with a distance between the sound source and the attended point in a case where the attended point is determined as being contained in the area by the determination unit.

The reproducing unit reproduces the sound varied by the determination unit.

By configuring as above, for example, when a user character object exists in an area set for the character object, the sound processing apparatus can properly vary sound uttered from the character object based on the distance between the character object and user character object. That is, sound can be effectively reproduced according to the distance between a sound source and a position where the sound is heard in virtual space.

A sound processing apparatus according to another aspect of the present invention, comprises a storage unit, a determination unit, a varying unit, and a reproducing unit.

The storage unit stores, for each of a plurality of sound sources placed in virtual space, a position of the sound source, a reference distance defining an area associated with the sound source, and predetermined minimum volume of sound to be uttered from the sound source, and stores a position of an attended point placed in the virtual space.

The determination unit, for each of the plurality of sound sources, calculates a distance between the sound source and the attended point in accordance with the position of the sound source and the position of the attended point stored in the storage unit, and determines whether or not the attended point is contained in an area associated with the sound source based on whether or not the calculated distance is smaller than the reference distance of the sound source.

The varying unit varies volume of sound to be uttered from the sound source into one that is correlated in advance such that the larger the distance between the sound source and the attended point is, the smaller the volume of the sound is, in a case where the attended point is determined by the determination unit as being contained in the area, and varies the volume of the sound so as to be the minimum volume in a case where the attended point is determined as being not contained.

The reproducing unit reproduces the sound varied by the varying unit.

By configuring as above, for example, when a user character object exists in an area set for each character object, the sound processing apparatus can properly vary sound uttered from the character object based on the distance between the character object and user character object. That is, sound can be effectively reproduced according to the distance between a sound source and a position where sound is heard in virtual space.

The storage unit may further store information designating a combination of a plurality of sound sources, and the varying unit may vary respective volumes of respective sounds to be uttered from the sound sources designated by the combination, in parallel with each other.

By configuring as above, the sound processing apparatus can reduce a memory capacity to be used.

A sound processing method according to another aspect of the present invention, is the method to be performed by a sound processing apparatus having a storage unit which comprises a determination step, a varying step, and a reproducing step.

The storage unit stores an area associated with a sound source placed in virtual space.

In the determination step, for the sound source, whether or not an attended point placed in the virtual space is contained in the area which is associated with the sound source and stored in the storage unit is determined.

In the varying step, sound to be uttered from the sound source is varied in accordance with a distance between the sound source and the attended point in a case where the attended point is determined by the determination step as being contained in the area.

In the reproducing step, the sound varied in the varying step is reproduced.

Thus, the sound processing apparatus using the above sound processing method, when a user character object exists in an area set for each character object, can properly vary sound for each sound to be uttered from the character object based on the distance between the character object and user character object. That is, sound can be effectively reproduced according to the distance between a sound source and a position where the sound is heard in virtual space.

A sound processing method according to another aspect of the present invention, is the method to be performed by a sound processing apparatus having a storage unit and includes a determination step, a varying step, and a reproducing step.

The storage unit stores, for each of a plurality of sound sources placed in virtual space, a position of the sound source, a reference distance defining an area associated with the sound source, and predetermined minimum volume of sound to be uttered from the sound source, and stores a position of an attended point placed in the virtual space.

In the determination step, for each of the plurality of sound sources, a distance between the sound source and the attended point is calculated in accordance with the position of the sound source and the position of the attended point stored in the storage unit, and whether or not the attended point is contained in the area associated with the sound source is determined based on whether or not the calculated distance is smaller than the reference distance of the sound source.

In the varying step, volume of sound to be uttered from the sound source is varied into one that is correlated in advance such that the larger the distance between the sound source and the attended point is, the smaller the volume of the sound is, in a case where the attended point is determined by the determination step as being contained in the area, and the volume of the sound is varied so as to be the minimum volume in a case where the attended point is determined as being not contained.

In the reproducing step, the sound varied in the varying step is reproduced.

Thus, the sound processing apparatus using this sound processing method, when a user character object exists in an area set for the character object, can properly vary sound uttered from the character object based on the distance between the character object and the user character object. That is, sound can be effectively reproduced according to the distance between a sound source and a position where the sound is heard in virtual space.

An information recording medium according to another aspect of the present invention, stores a program for controlling a computer to function as a storage unit, a determination unit, a varying unit, and a reproducing unit.

The storage unit stores an area associated with a sound source placed in virtual space.

The determination unit determines whether or not an attended point placed in the virtual space is contained in the area which is associated with the sound source and stored in the storage unit.

The varying unit varies sound to be uttered from the sound source in accordance with a distance between the sound source and the attended point in a case where the attended point is determined as being contained in the area by the determination unit.

The reproducing unit reproduces the sound varied by the varying unit.

Thus, by this program, the information recording medium can control a computer to function as a device which can properly vary sound uttered from the character object based on the distance between the character object and user character object when the user character object exists in an area set for the character object.

An information recording medium according to another aspect of the present invention, stores a program for controlling a computer to function as a storage unit, a determination unit, a varying unit, and a reproducing unit.

The storage unit stores, for each of a plurality of sound sources placed in virtual space, a position of the sound source, a reference distance defining an area associated with each of the plurality of sound sources, and predetermined minimum volume of sound to be uttered from the sound source, and stores a position of an attended point placed in the virtual space.

The determination unit, for each of the plurality of sound sources, calculates a distance between the sound source and the attended point in accordance with the position of the sound source and the position of the attended point stored in the storage unit, and determines whether or not the attended point is contained in the area associated with the sound source based on whether or not the calculated distance is smaller than the reference distance of the sound source.

The varying unit varies volume of sound to be uttered from the sound source into one that is correlated in advance such that the larger the distance between the sound source and the attended point is, the smaller the volume of the sound is, in a case where the attended point is determined by the determination unit as being contained in the area, and varies the volume of the sound so as to be the minimum volume in a case where the attended point is determined as being not contained.

The reproducing unit reproduces the sound varied by the varying unit.

By configuring as above, the program can control a computer to function as a device which can properly vary sound uttered from the character object based on the distance between the character object and user character object when the user character object exists in an area set for the character object.

A program according to another aspect of the present invention controls a computer to function as a storage unit, a determination unit, a varying unit, and a reproducing unit.

The storage unit stores an area associated with a sound source placed in virtual space.

The determination unit determines whether or not an attended point placed in the virtual space is contained in the area which is associated with the sound source and stored in the storage unit.

The varying unit varies sound to be uttered from the sound source in accordance with a distance between the sound source and the attended point in a case where the attended point is determined as being contained in the area by the determination unit.

The reproducing unit reproduces the sound varied by the varying unit.

By configuring as above, the program can control a computer to function as a device which can properly vary sound uttered from the character object based on the distance between the character object and a user character object when the user character object exists in an area set for the character object.

A program according to another aspect of the present invention controls a computer to function as a storage unit, a determination unit, a varying unit, and a reproducing unit.

The storage unit stores, for each of a plurality of sound sources placed in virtual space, a position of sound sources, a reference distance defining the area associated with each of the plurality of sound sources, and predetermined minimum volume of sound to be uttered from the sound source, and stores a position of an attended point placed in the virtual space.

The determination unit, for each of the plurality of sound sources, calculates a distance between the sound source and the attended point in accordance with the position of sound source and the position of the attended point stored in the storage unit, and determines whether or not the attended point is contained in the area associated with sound source based on whether or not the calculated distance is smaller than a reference distance of sound sources.

The varying unit varies volume of sound to be uttered from the sound source into one that is correlated in advance such that the larger the distance between the sound source and the attended point is, the smaller the volume of the sound is, in a case where the attended point is determined by the determination unit as being contained in the area, and varies the volume of the sound so as to be minimum volume in a case where the attended point is determined as being not contained.

By configuring as above, the program can control a computer to function as a device which can properly vary sound uttered from the character object based on the distance between the character object and user character object, when the user character object exists in an area set for the character object.

Further, the program of the present invention may be stored in a computer-readable information recording medium such as a compact disk, flexible disk, hard disk, magnet optical disk, digital video disk, magnetic tape, or the like. The above program can be distributed and sold through a computer communication network independently of the computer that executes the program. Moreover, the above information recording medium can be distributed and sold independently of a computer.

Effects of the Invention

According to the present invention, sounds can be effectively reproduced according to the distance between a sound source and a position where the sounds are heard in virtual space.

BRIEF DESCRIPTION OF DRAWINGS

FIG. 4A An exemplary diagram showing information stored in the storage unit according to the embodiments 1 and 2.

FIG. 4B An exemplary diagram showing information stored in the storage unit according to the embodiments 1 and 2.

FIG. 4C An exemplary diagram showing information stored in the storage unit according to the embodiments 1 and 2.

FIG. 9A An exemplary diagram showing information stored in the storage unit according to the embodiment 3.

FIG. 9B An exemplary diagram showing information stored in the storage unit according to the embodiment 3.

FIG. 11A An exemplary diagram showing information stored in the storage unit according to the embodiment 4.

FIG. 11B An exemplary diagram showing information stored in the storage unit according to the embodiment 4.

FIG. 12A An exemplary diagram showing information stored in the storage unit according to the embodiment 5.

FIG. 12B An exemplary diagram showing information stored in the storage unit according to the embodiment 5.

FIG. 12C An exemplary diagram showing information stored in the storage unit according to the embodiment 5.

DESCRIPTION OF REFERENCE NUMERALS

Figure 1:
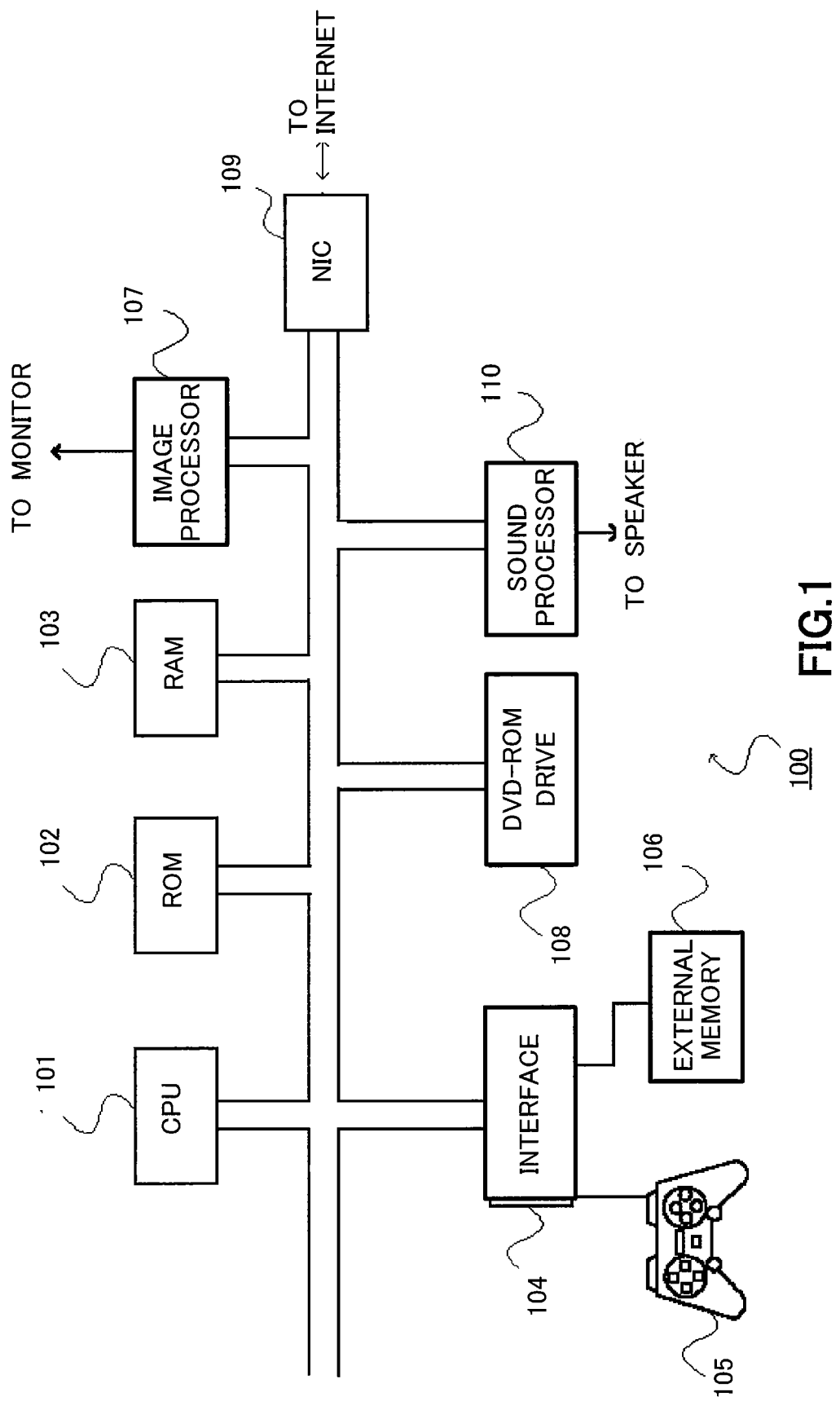
FIG. 1 A diagram showing an overview of configurations of a typical information processing device on which a sound processing apparatus of the present invention is realized.

100: information processing device
101: CPU
102: ROM
103: RAM
104: interface
105: controller
106: external memory
107: image processor
108: DVD-ROM drive
109: NIC
110: sound processor
200: sound processing apparatus
201: storage unit
202: determination unit
203: varying unit
204: reproducing unit
301: sound source
302: attended point

BEST MODE FOR CARRYING OUT THE INVENTION

Embodiments of the present invention will be described below. While the following describes embodiments in which the present invention is adapted to a game information processing device for the ease of understanding, the embodiments to be described below are written for explanation and not to limit the scope of the invention. Therefore, those skilled in the art can employ embodiments in which the individual elements or all the elements are replaced with equivalent ones, and which are also encompassed in the scope of the invention.

Embodiment 1

FIG. 1 is a schematic diagram showing an overview of configurations of a typical information processing device which performs functions of the sound processing apparatus of the present invention by executing a program. Hereinafter, the configurations are described by referring to this drawing.

An information processing device 100 comprises a CPU (Central Processing Unit) 101, a ROM (Read Only Memory) 102, a RAM (Random Access Memory) 103, an interface 104, a controller 105, an external memory 106, an image processor 107, a DVD-ROM (Digital Versatile Disc-Read Only Memory) drive 108, an NIC (Network Interface Card) 109, and a sound processor 110.

As a DVD-ROM storing a program and data for a game is loaded onto the DVD-ROM drive 108 and the information processing device 100 is powered on, the program is executed to realize the sound processing apparatus of the present embodiment.

The CPU 101 controls the general operation of the information processing device 100 and is connected to individual components, and exchanges control signals and data therewith. Further, by using an ALU (Arithmetic Logic Unit) (not shown), the CPU 101 can perform arithmetic operations such as addition, subtraction, multiplication, division, etc., bit operations such as bit addition, bit multiplication, bit inversion, bit shift, bit rotation, etc., on a storage area, or a register (not shown) which can be accessed at a high speed. Furthermore, the CPU 101 itself may be designed to be able to rapidly perform saturation operations such as addition, subtraction, multiplication, division, etc., for handling multimedia processor, vector operations such as trigonometric function, etc., or may realize these with a coprocessor.

An IPL (Initial Program Loader) which is executed immediately after power-on is stored in the ROM 102. As the IPL is executed, the program stored in the DVD-ROM is read into the RAM 103 and is executed by the CPU 101. Further, the RAM 102 stores a program and various data for an operating system necessary for controlling the general operation of the information processing device 100.

The RAM 103 is for temporarily storing data and programs, and retains the program and data read from the DVD-ROM, and other data needed for progressing a game and chat communication. Further, the CPU 101 performs processes such as securing a variable area in the RAM 103 to work the ALU directly upon the values stored in the variable to perform operations, or storing the value stored in the RAM 103 in the register, performing operations on the register, and writing back the operation result to the memory, etc.

The controller 105 connected via the interface 104 receives an operation input which is made when a user plays a game such as a mah-jongg game, cards, etc.

The external memory 106 detachably connected via the interface 104 is rewritably stored data designating the play status (past performance, etc.) of a mah-jongg game, etc, data designating the progress status of the games, data of chat communication logs (records) in the case of network competition, and so on. As the user makes an instruction input via the controller 105, these data can appropriately be recorded in the external memory 106.

The program for realizing the game and the image data and sound data accompanying the game are stored in the DVD-ROM to be loaded into the DVD-ROM drive 108. Under the control of the CPU 101, the DVD-ROM drive 108 performs a process of reading from the DVD-ROM loaded therein to read a necessary program and data, and these are temporarily stored in the RAM 103 or the like.

The image processor 107 processes data read from the DVD-ROM by means of the CPU 101 and an image operation processor (not shown) comprised in the image processor 107, and then records the data in a frame memory (not shown) in the image processor 107. The image information recorded in the frame memory is converted into a video signal at a predetermined synchronous timing, which is in turn output to a monitor (not shown) connected to the image processor 107. Thereby, image displays of various types are available.

The image operation processor can enable fast execution of an overlay operation of a two-dimensional image, a transparent operation such as alpha blending, and various kinds of saturation operations.

It is also possible to enable fast execution of an operation of rendering polygon information which is arranged in virtual three-dimensional space and to which various kinds of texture information are added, by using a Z buffer method to acquire a rendered image with a downward view of a polygon toward a predetermined sight line, arranged within the virtual three-dimensional space, from the predetermined viewpoint position.

Further, the CPU 101 and the image operation processor cooperate to be able to write a string of characters as a two-dimensional image in the frame memory or on each polygon surface according to font information which defines the shapes of characters.

For example, by storing information such as images of mah-jongg tiles and images of playing cards in the DVD- ROM and by loading the information into the frame memory, it is possible to display an image of a presently holding tile or presently holding card.

The NIC 109 serves to connect the information processing device 100 to a computer communication network (not shown) such as the Internet or the like. Such the NIC 109 is pursuant to the 10 BASE-T/100 BASE-T standard which is used when configuring a LAN (Local Area Network), or an analog modem for connecting to the Internet using a telephone circuit, an ISDN (Integrated Services Digital Network) modem, an ADSL (Asymmetric Digital Subscriber Line) modem, a cable modem for connecting to the Internet using a cable television circuit, or the like, and an interface (not shown) which intervenes between the CPU 101 and any one of such the modems.

The sound processor 110 converts sound data read from the DVD-ROM into an analog sound signal and outputs the converted sound signal from a speaker (not shown) connected thereto. Further, under the control of the CPU 101, the sound processor 110 reads sound data of an effect sound to be produced during the progress of a game and outputs sounds from a speaker.

In a case where the sound data recorded on the DVD-ROM is MIDI data, the sound processor 110 refers to the sound source data included in the data, and converts the MIDI data into PCM data. Further, in a case where the sound data is compressed sound data of an ADPCM (Adaptive Differential Pulse Code Modulation) format or Ogg Vorbis format, etc., the sound processor 110 decompresses the data, converting it to PCM data. The PCM data is D/A (Digital/Analog) data converted at a timing corresponding to the sampling frequency of the data and output to the speaker, thereby enabling sound outputting.

In addition, the information processing device 100 may be configured to achieve the same functions as the ROM 102, the RAM 103, the external memory 106, and the DVD-ROM which is to be loaded onto the DVD-ROM drive 108 or the like by using a large-capacity external storage device, such as a hard disk.

Next, processing to be performed by the sound processing apparatus 200 of the embodiment is described.

Figure 2:
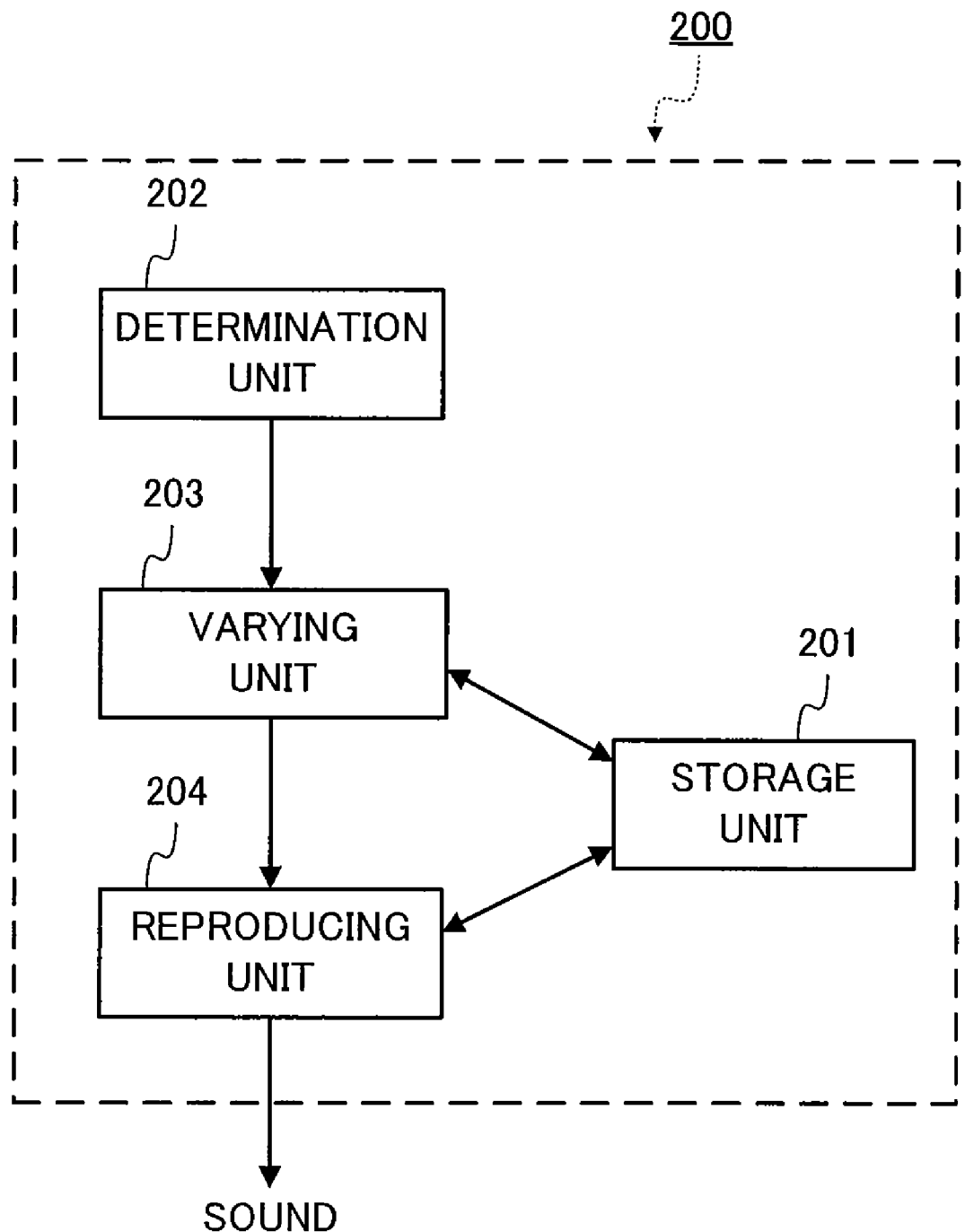
FIG. 2 A diagram showing configurations of the sound processing apparatus of the present invention.

FIG. 2 is a schematic diagram showing an overview of configurations of the sound processing apparatus 200 of the present invention. The sound processing apparatus 200 includes a storage unit 201, a determination unit 202, a varying unit 203, and a reproducing unit 204.

Figure 3:
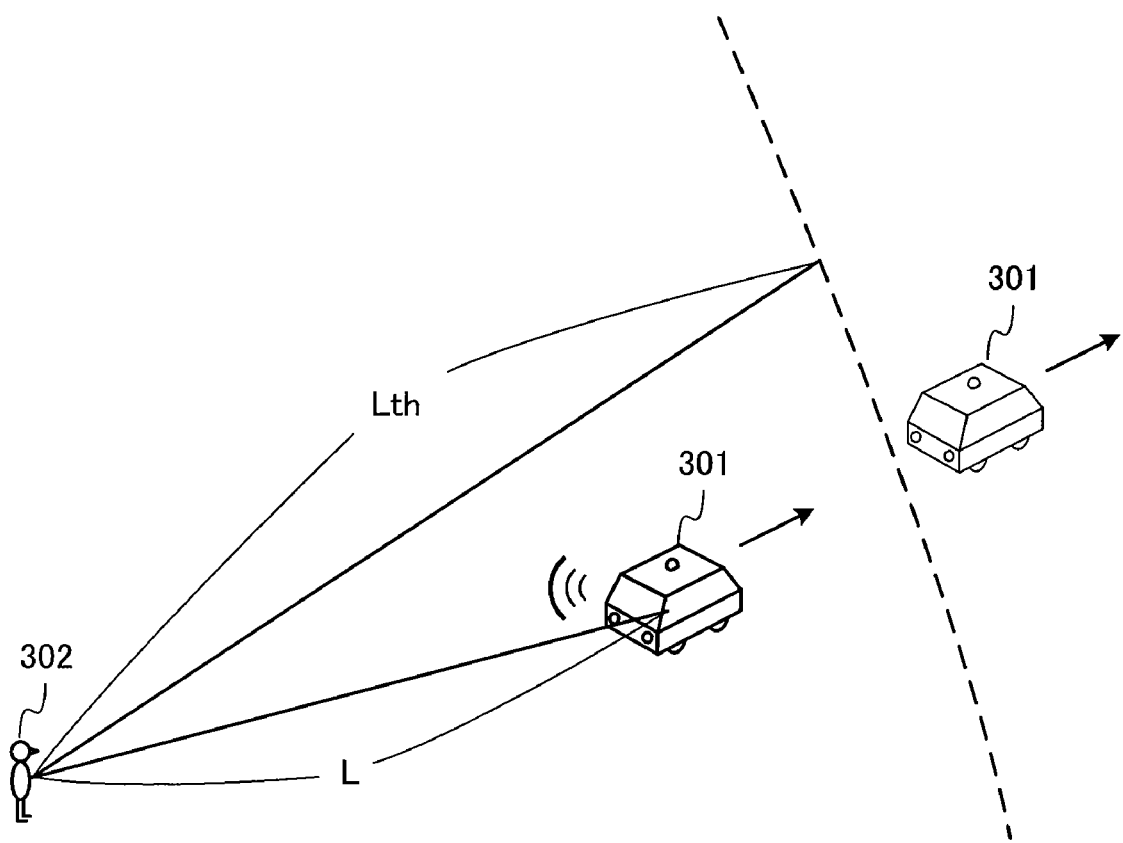
FIG. 3 An explanatory diagram showing a positional relation between a sound source and an attended point.

FIG. 3 is a diagram showing a positional relation between a sound source 301 placed in three-dimensional virtual space and an attended point which the sound uttered from the sound source 301 reaches. The sound source 301 is a character object which can move in the virtual space and outputs sounds or effect sounds at a predetermined timing during the progress of a game. The sound processing apparatus 200 starts to reproduce predetermined sound data so that sound from the sound source 301 is heard during the progress of the game, or stops the reproduction of the sound data so that sound from the sound source 301 is not heard. The attended point 302 is a position, in a typical case, where a user character object is placed. Thus, a user of the sound processing apparatus 200 can hear the sound uttered from the sound source 301 in the position of the user character object placed in the virtual space.

The sound processing apparatus 200 makes lower volume of sound, uttered from the sound source 301 in the position of the user character object placed in virtual space, lower as the distance between the sound source 301 and attended point is larger. Further, as described later, the sound processing apparatus 200 exercises control so as to effectively reproduce sound by performing processing (hereinafter "sound controlling processing") of controlling sound uttered from the sound source 301 based on information showing an area preset for each character object serving as the sound source 301 and on the distance L.

The storage unit 201 stores information showing an area associated with the sound source 301 placed in virtual space. The storage unit 201 stores information showing, for example, a range of the distance between the sound source 301 and the attended point 302 to be associated with the sound source 301. According to this embodiment, the information is recorded, in advance, in the DVD-ROM loaded into the DVD-ROM drive 108.

Moreover, the CPU 101 and the DVD-ROM drive 108 work in cooperation to function as the storage unit 201.

More specifically, for example, the storage unit 201 stores a reference distance to define an area associated with the sound source 301 as the unit of a virtual distance in virtual space. In the case shown in the drawing, the storage unit 201 stores information showing that sound is reproduced when the distance between the sound source 301 (engine of a running vehicle object) and the attended point (user character object hearing the engine sound of the running vehicle object) is in a range of 0 to 100 meters associated with sound to be reproduced "engine sound of a vehicle". In other word, the storage unit 201 stores information showing that the reproduction by the reproducing unit 204 is stopped when the distance between the sound source 301 and the attended point 302 exceeds 100 meters. Thus, the storage unit 201 stores information showing a distance range corresponding to each of sound sources 301 or each of sounds to be produced.

Alternatively, the storage unit 201, as shown in FIG. 4B, may be configured to store a reference distance as the unit of a virtual distance in virtual space in a manner to be associated with a file name of sound data. In the case shown in the drawing, the storage unit 201 may store information that sound associated with sound data (for example, engine sound of a running vehicle object) having a file name "onsei01.wav" is reproduced when the distance between the sound source 301 (for example, a running vehicle object) and the attended point 302 (for example, a user character object hearing an engine sound of the running vehicle object) is in the range of 0 to 100 meters. Thus, the storage unit 201 may be configured to store each individual distance range corresponding to each sound data.

Further, in a case where sound is to be reproduced regardless of a position of the sound source 301 in virtual space (regardless of a distance between the sound source 301 and the attended point 302), the information to be stored in the storage unit 201, as shown in FIG. 4C, may be set by using a value Linf being large enough to be substantially considered as infinite as a distance range for the reproduction.

The storage unit 201, for example, may assign an intrinsic number to each of effect sounds and store a reference distance to be associated with the intrinsic number. Moreover, the reference distance may be stored in a manner to be associated with each sound source 301 or each kind of character objects also being able to serve as the sound source 301.

The reference distance to be stored in the storage unit 201 and to be associated with the sound source 301 is not limited to the above-described information designating the distance range between the sound source 301 and the attended point 302. For example, the storage unit 201 may store an area where sound is transmitted, direction where sound is transmitted, or transmission speed of sound obtained by taking into consideration shielding of sound or reflection of sound caused by an obstacle. Thereby, sound effect providing reality can be obtained effectively.

Further, a specified format of sound data to record information showing a distance range for reproduction may be defined. This enables the management of data to be stored in the storage unit 201 to be simplified. Moreover, when sound data using the specified format is to be reproduced, control can be exercised so that production is performed by sound control processing of the present invention described later and so that the sound control processing of the present invention is not performed by other format.

The storage unit 201 may be configured to store these information into other storage medium such as a ROM 102 or external memory 106.

Further, the storage unit 201 may be realized as a program having, in advance, data showing a range of a distance between the sound source 301 and the attended point 302.

The determination unit 202 calculates a distance in accordance with coordinates value of the sound source 301 placed in virtual space and coordinates value of the attended point 301 of sound to be uttered from the sound source 301 to determine whether or not the attended point 302 is contained in the distance range stored in the storage unit 201. In the case where a plurality of sound sources 301 is placed in the virtual space, the determination unit 202 calculates a distance between the sound source 301 and the attended point 302 for sound to be uttered from the sound source 301 to determine whether or not the attended point 302 is contained in the distance range stored in the storage unit 201. The determination unit 202 inputs the determination result to the varying unit 203.

Moreover, the CPU 101 and image processor 107 work in cooperation to function as the determination unit 202.

Here, each of the coordinate values is expressed by using a coordinates system being generally available. For example, the virtual space is expressed by an orthogonal coordinate system using an orthogonal coordinate system having orthogonal three axes or a spherical coordinate system such as spherical coordinates using one radius vector and two angles of deviation. Coordinate calculation may be performed by separately setting a global coordinate system (world coordinate system) expressing entire virtual space and local coordinate system (body coordinate system) for each character object.

The varying unit 203 varies sound to be uttered from the sound source 301 in accordance with the distance between the sound source 301 and the attended point 302 calculated by the determination unit 202. That is, the varying unit 203 calculates sound volume corresponding to the distance obtained by the determination unit 202 at predetermined timing when an effect sound or the like is uttered from the sound source 301 during the progress of a game.

Moreover, the varying unit 203 performs its function by cooperative operations with the CPU 101 and sound processor 110.

Any format of sound data can be employed. The sound processing apparatus 200 can read a predetermined program for sound reproduction corresponding to the format from the DVD-ROM, ROM 102, and etc., storing the program in advance for execution and sound data can be reproduced.

Figure 5A:
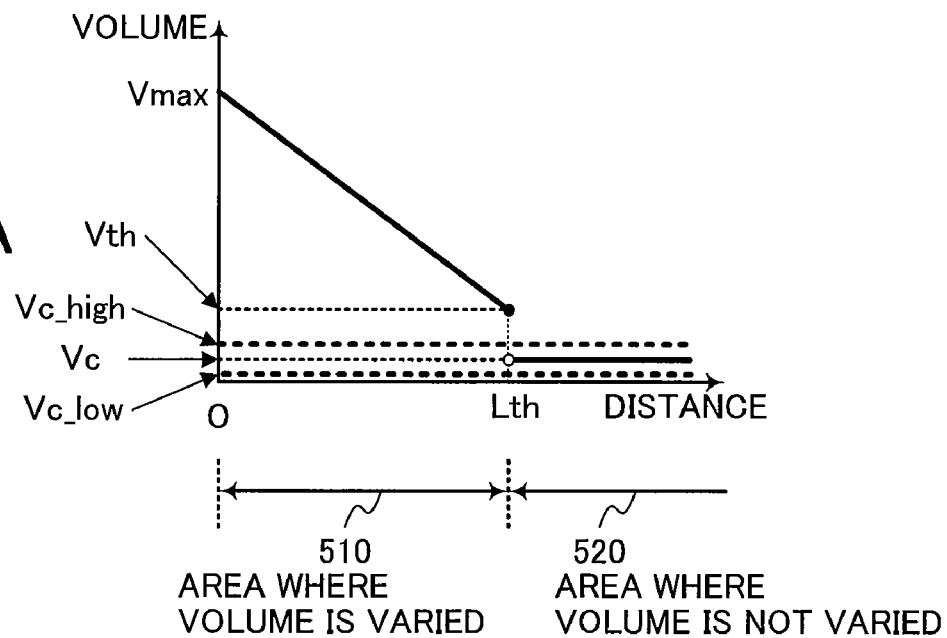
FIG. 5A An exemplary diagram showing a relation among a distance between the sound source and the attended point and the volume of the sound varied by the varying unit.

More specifically, for example, the varying unit 203 lowers volume of the sound uttered from the sound source 301 obtained at the attended point 302 as the distance between the sound source 301 and the attended point 302 is larger as shown in FIG. 5A. When the distance between the sound source 301 and the attended point 302 is larger than a predetermined threshold value Lth, the varying unit 203 keeps the volume of the sound from the sound source 301 to be close to the predetermined threshold value (range between Vc_low and Vc_high).

Figure 5B:
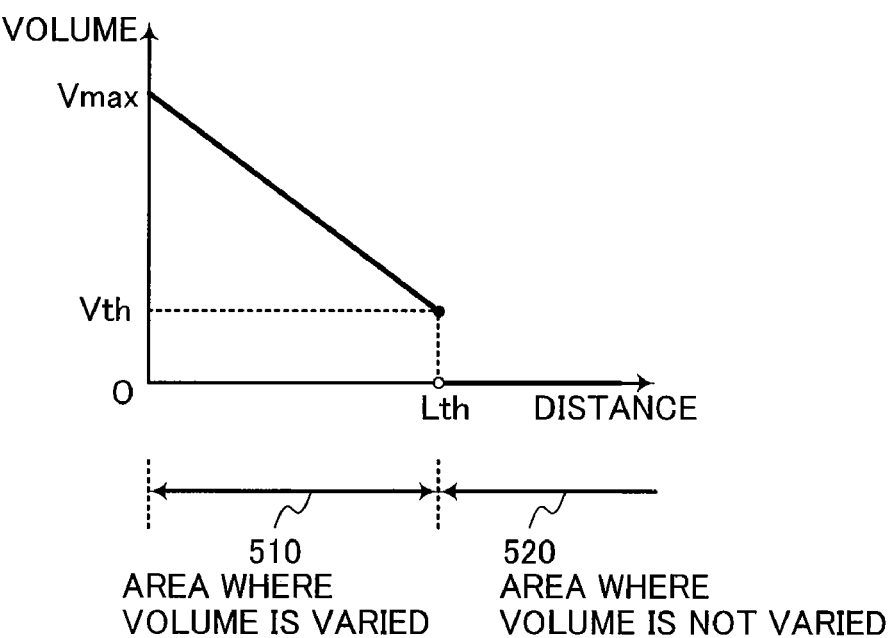
FIG. 5B An exemplary diagram showing a relation among a distance between the sound source and the attended point and the volume of the sound varied by the varying unit.

Also, for example, the varying unit 203 lowers the volume of the sound from the sound source 301 obtained at the attended point 302 as the distance between the sound source 301 and the attended point 302 is larger as shown in FIG. 5B. When the distance between the sound source 301 and the attended point 302 is large in degree that sound uttered from the sound source 301 is not heard, the varying unit 203 keeps the volume at a predetermined minimum level. Typically, the varying unit 203 keeps the volume at a level being zero or being near to zero. Thus, the varying unit 203 varies the volume if the distance is within the area 510 and does not vary the volume if the distance is within the area 520.

The reproducing unit 204 reproduces the sound varied by the varying unit 203. That is, the reproducing unit 204 obtains sound data corresponding to the sound uttered from the sound source 301, decodes the sound data using a specified program corresponding to the sound data, and reproduces sounds whose volume has been varied by the varying unit 203.

The timing of reading the sound data should be before the reproduction of the sound data is started by the reproducing unit 204. The present invention can be applied in the case of stream reproduction of sound data being stored in an information recording medium such as a DVD-ROM.

For example, it is presumed that the sound from the sound source 301 which is obtained at the attended point 302 has been varied by the varying unit 203 as shown in FIG. 5A. The reproducing unit 204 gradually lowers volume of sound when the distance between the sound source 301 and the attended point 302 is between the value 0 and a threshold value Lth. On the other hand, the distance between the sound source 301 and the attended point 302 exceeds the threshold value Lth, and the sound volume is kept in a range of a predetermined level being near to the volume value Vc. Thereby, the volume of the sound to be reproduced by the reproducing unit 204 becomes constant at a level being near the volume Vc.

Further, for example, it is presumed that the sound from the sound source 301 which is obtained at the attended point 302 has been varied by the varying unit 203 as shown in FIG. 5B. The reproducing unit 204 keeps volume value to zero when the distance between the sound source 301 and attended point 302 exceeds the threshold value Lth. This allows the reproducing unit 204 to exercise control so that the sound uttered from the sound source 301 is not heard by the user. Moreover, in FIG. 5A and FIG. 5B, the change of the volume is shown as a linear change, however, the volume is not limited to those in the drawings and may be set arbitrarily. It is desirable that the volume is monotonously lowered in a manner to correspond to the distance.

Figure 6:
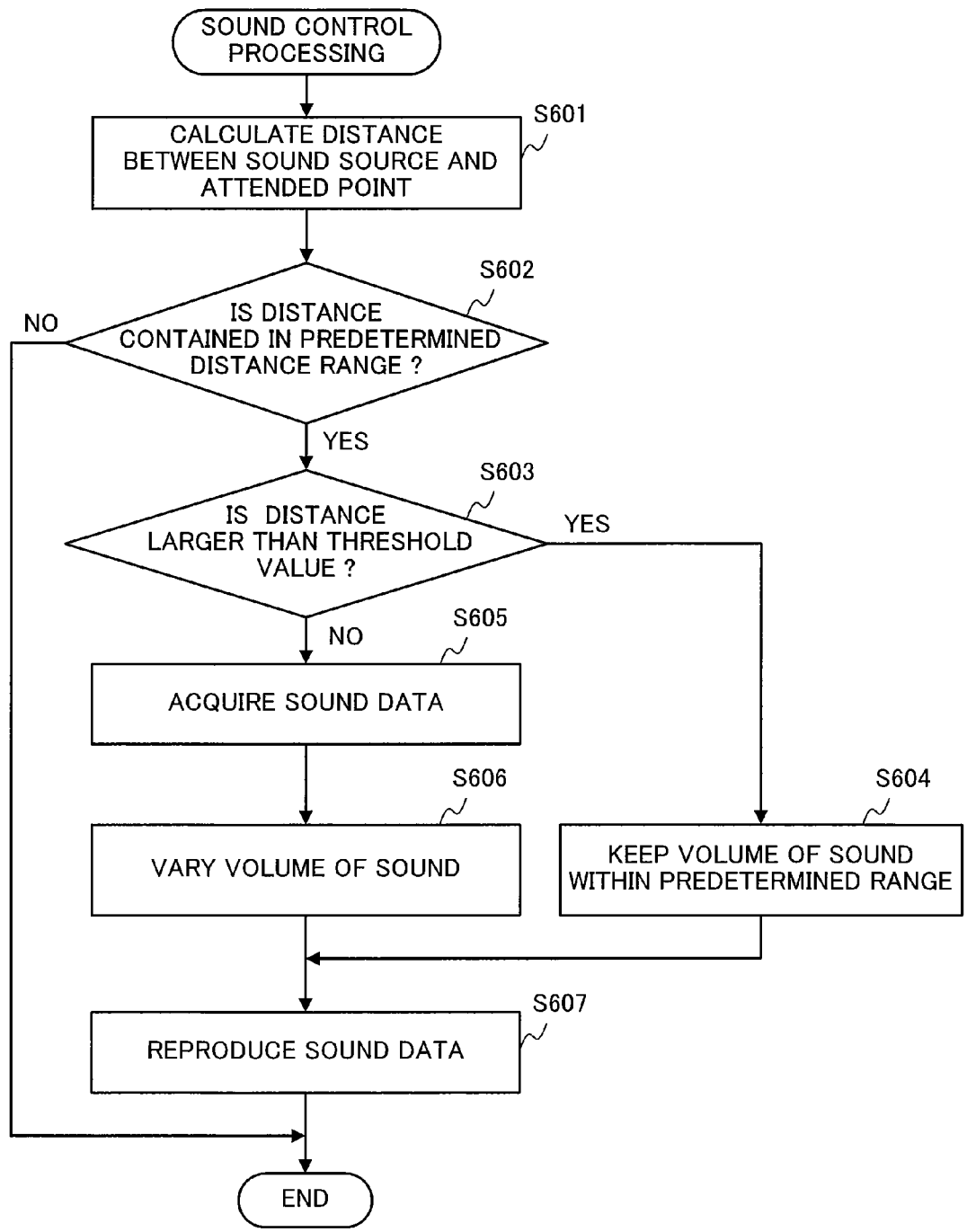
FIG. 6 A flowchart showing sound control processing.

Next, sound control processing to be performed by the CPU 101 or the like of this embodiment of the present invention is described by using a flowchart in FIG. 6. In the description below, an example is used in which sound (for example, engine sound) uttered from a vehicle object (character object) running in virtual space is heard at the position of a user character object placed similarly in virtual space.

First, the determination unit 202 calculates the distance between a character object being the sound source 301 and a user character object being the attended point 302 (step S601).

Next, the determination unit 202 determines whether or not the attended point 302 is contained in a predetermined area (step S602). For example, the determination unit 202 obtains the information showing a distance range corresponding to the running vehicle object serving as the sound source 301 from the storage unit 201, and determines whether or not the distance calculated in step S601 is contained in the distance range. However, the information being stored in the storage unit 201 and showing a predetermined area is not limited to the information showing the distance range from the attended point 302. For example, the information may be the information showing an area considered with the shielding of sounds or the reflection of sounds caused by an obstacle.

In the case where the attended point 302 is not contained in a predetermined area (step S602; NO), the determination unit 202 terminates the sound control processing. That is, in this case, the sound to be uttered from the sound source 301 is not reproduced. If the sound uttered from the sound source 301 is being reproduced, the reproducing unit 204 stops the reproduction.

In the case where the attended point 302 is contained in the predetermined area (step S602; YES), the varying unit 203 determines whether or not the distance calculated in the step S601 is larger than the predetermined threshold value Lth (step S603).

In the case where the obtained distance is larger than the predetermined threshold value Lth (step S603; YES), the varying unit 203 keeps volume of sound (engine sound of the running vehicle object) to be uttered from the sound source 301 within a predetermined volume range (step S604).

On the other hand, in the case where the obtained distance is smaller than the predetermined threshold value Lth (step S603; NO), the varying unit 203 obtains sound data corresponding to the sound uttered from the sound source 301 (step S605). Moreover, in the case where the same sound data has been reproduced immediately before being obtained in step S605 and has been left as cache data in the RAM 103 or a like, this step can be omitted.

Further, the varying unit 203 varies the volume based on the distance obtained in step S601 (step S606). For example, the varying unit 203 varies so as to lower the volume the more as the distance between the sound source 301 and the attended point 302 is larger.

Furthermore, the reproducing unit 204 reproduces the sound varied in steps S604 or S606 and outputs the reproduced sound (step S607).

Thus, the sound processing apparatus 200 varies sound to be uttered from the sound source 301 based on the area corresponding to the sound source 301 stored in the storage unit 201. That is, the sound processing apparatus 200 can effectively reproduce sound being heard at the attended point 302 by varying the sound volume corresponding to the distance between the sound source 301 and the attended point 302 hearing the sound in virtual space.

Moreover, according to this embodiment of the present invention, the sound processing apparatus 200 reproduces sound by varying the sound for each sound source 301, however, can exercise control using the above-described sound control processing as to whether or not the sound is reproduced for each kind of the sound sources 301 (for example, enemy character or ally character). In this case, for example, the storage unit 201 further stores attribute information (for example, the information as to whether a character is an enemy or an ally, as to whether or not sound is reproduced by providing priority, etc.) of the sound source 301 in a manner to be associated with the sound source 301, and the varying unit 203 may exert control as to whether or not the sound is reproduced using the above-described sound control processing based on the above attribute information. Or, control as to whether or not the above sound control processing is performed is exerted based on a kind or a file format of sound data.

Embodiment 2

Next, another embodiment of the present invention is described. In this embodiment, the varying unit 203 and reproducing unit 204 stops the processing of the sound uttered from the sound source 301 when the distance between the sound source 301 and the attended point 302 is larger than a predetermined reference distance Lc. Moreover, other configurations of the sound processing apparatus 200 of this embodiment are the same as those in the above described embodiment and their descriptions are omitted accordingly. Hereinafter, detailed descriptions are provided below.

The storage unit 201 stores an area in which sound is reproduced in a manner to be associated with the sound uttered from the sound source 301. For example, the storage unit 201 stores such information as described in FIG. 4A. In the case shown in FIG. 4A, the storage unit 201 stores information showing which sound is reproduced when a distance between the sound source 301 (engine of a running vehicle object) and the attended point (user character object hearing the engine sound of the running vehicle object) is in a range of 0 to 100 meters in a manner in which sound to be produced is associated with sound to be reproduced. However, the distance is a virtual distance in virtual space. The storage unit 201 stores information showing each distance for each sound source 301. This drawing is one example of the information to be stored in the storage unit 201 and the information may be changed in any manner for setting.

The varying unit 203 stops the processing of varying sound to be uttered from the sound source 301 when the distance between the sound source 301 and the attended point 302 is larger than a predetermined reference distance Lc. That is, in this case, the varying unit 203 does not vary volume of the sound.

The reproducing unit 204 does not perform the processing of reproducing the sound varied by the varying unit 203 when the distance between the sound source 301 and the attended point 302 is larger than a predetermined reference distance Lc. That is, in this case, the reproducing unit 204 does not reproduce the sound uttered from the sound source 301. For example, it is presumed that the reproducing unit 204 reproduces an engine sound uttered from a vehicle object (sound source 301) running in an area being near to the attended point 302 and the sound source 301 gradually goes away from the attended point 302. In this situation, the reproducing unit 204 stops the reproduction of sound of an engine uttered from the vehicle object when the distance between the sound source 301 and attended point 302 is larger than a predetermined reference distance Lc.

Figure 7A:
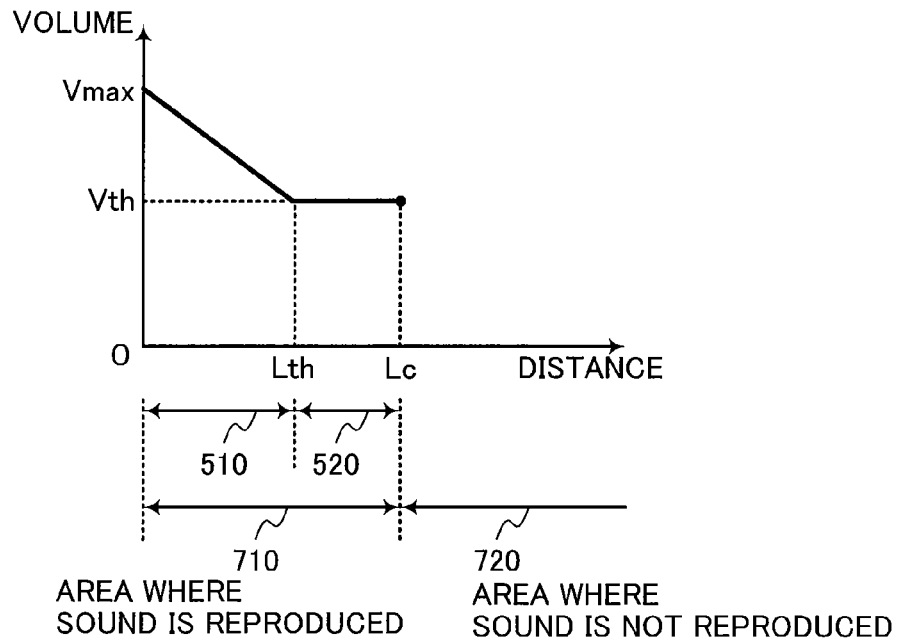
FIG. 7A An exemplary diagram showing a relation among a distance between the sound source and the attended point, the volume of the sound varied by the varying unit, and a region in which the sound is reproduced or not reproduced by the reproducing unit.

FIG. 7A is a diagram showing an example of volume of sound uttered from the sound source 301 in the sound control processing of this embodiment. The varying unit 203 obtains information showing an area (distance range in FIG. 7A) associated with the sound source 301. When the attended point 302 is within this area and the distance is between 0 and Lth, the volume is lowered in a manner to correspond to the distance. Then, when the distance is larger than the threshold value Lth, the varying unit 203 keeps the volume of the sound to be close to the predetermined volume Vth. Further, when the distance between the sound source 301 and the attended point 302 is larger than the predetermined reference distance Lc, the reproducing unit 204 stops the reproduction of the sound. That is, the reproducing unit 204 reproduces sound from the sound source 301 in a case where the distance is within the area 710, and does not reproduce sound from the sound source 301 in a case where the distance is within the area 720.

This enables the sound processing apparatus 200 to effectively reproduce sound even if there is a hardware or software limitation on the number of sounds (number of reproducing trucks) being able to be simultaneously reproduced. That is, this avoid the state in which, since the reproducing truck is occupied due to the reproduction of sound being substantially not heard, other effect sound to be reproduced originally with a high volume is not correctly reproduced when the number of sounds to be simultaneously reproduced is increased. The sound processing apparatus 200 can effectively reproduce sound by exercising control as to whether sound is to be reproduced or not reproduced depending on the distance between the sound source 301 and the attended point 302 where the sound is heard in virtual space.

Moreover, the sound processing apparatus 200, when the distance between the sound source 301 and the attended point 302 is larger than the predetermined reference distance, the processing of varying the sound uttered from the sound source 301 can be omitted. That is, in the conventional technology, a specified operation (for example, operation of considering influence by the reflection or shielding of sound) of varying sound based on the distance between the sound source 301 and the attended point 302 is performed, and sound is not reproduced if the volume obtained from the operation is lower than a predetermined level. However, according to the present invention, whether or not sound is reproduced can be determined without the specified operation and the processing of reproducing the sound can be simplified greatly.

The information stored in the storage unit 201 which shows an area associated with the sound source 301 may be used as the specified reference distance Lc. In this case, the information showing the area is the information showing a distance range in which sound uttered from the sound source 301 is reproduced. Owing to this, if the attended point 302 is not within the distance range associated with the sound source 301, sound is not varied by the varying unit 203 and sound is not reproduced by the reproducing unit 204, so the sound processing apparatus 200 is allowed to omit further the sound control processing.

Figure 7B:
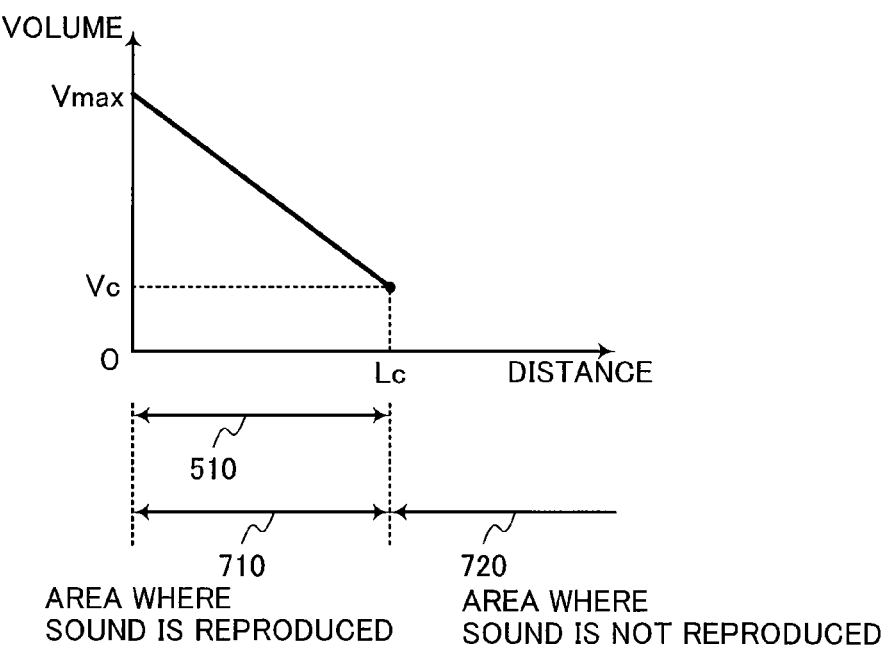
FIG. 7B An exemplary diagram showing a relation among a distance between the sound source and the attended point, the volume of the sound varied by the varying unit, and a region in which the sound is reproduced or not reproduced by the reproducing unit.

FIG. 7B shows an example of volume of sound to be uttered from the sound source 301 in a case the threshold value Lth to be used for the determination as to whether or not sound is varied by the varying unit 203 is made to coincide with the reference distance Lc to be used for the determination as to whether or not the sound is reproduced by the reproducing unit 204. When the distance between the sound source 301 and the attended point 302 is within the specified reference distance Lc, the varying unit 203 varies the sound so that its volume is gradually lowered and the reproducing unit 204 reproduces the varied sound. Then, if the distance exceeds the reference distance Lc, the varying unit 203 does not vary the sound and the reproducing unit 204 does not reproduce the sound.

In addition, in a case where the distance between the sound source 301 and the attended point 302 is larger than the specified reference distance Lc, the sound to be uttered from the sound source 301 is not reproduced by the reproducing unit 204 and, therefore, the varying unit 203 may or may not vary the sound. In order to simplify the sound control processing, it is desirable that the varying unit 203 does not perform the processing of varying the sound.

Figure 8:
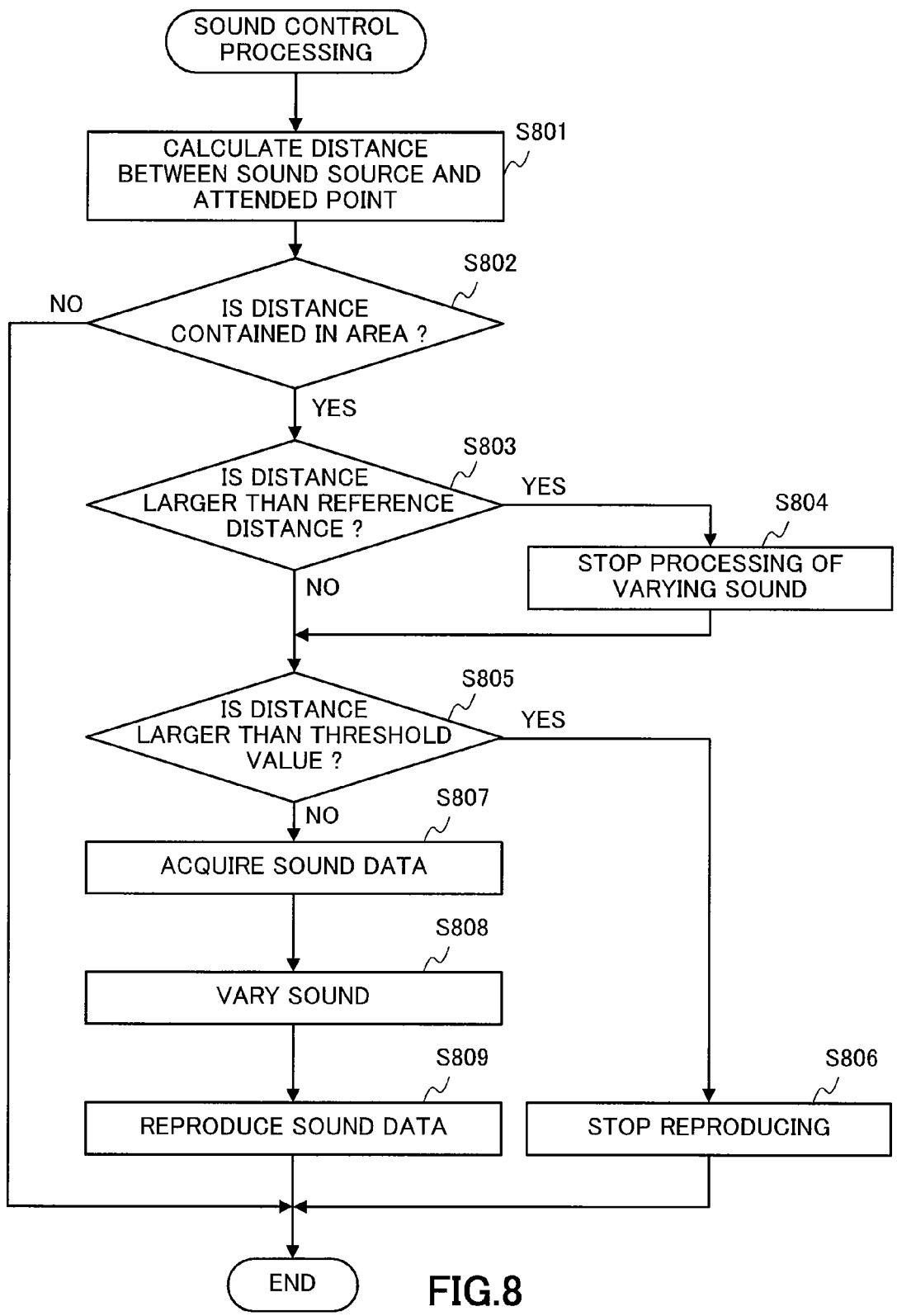
FIG. 8 A flowchart showing sound control processing according to the embodiment 2.

Next, the sound control processing to be performed by the CPU 101 or a like of this embodiment of the present invention is explained by referring to the flowchart in FIG. 8.

First, the determination unit 202 calculates the distance between the sound source 301 and the attended point 302 (step S801).

Next, the determination unit 202 determines whether or not the attended point 302 is contained in the area stored in the storage unit 201 (step S802).

If the attended point 302 is not contained in the area (step S802; NO), the determination unit 202 terminates the sound control processing. In this case, sound uttered from the sound source 301 is not reproduced. In the case where sound uttered from the attended point 302 is being reproduced, the reproduction of sound is stopped by the reproducing unit 204.

If the attended point 302 is contained in the area (step S802; YES), the varying unit 203 determines whether or not the distance calculated in step S801 is larger than the predetermined reference distance Lc (step S803).

If the calculated distance is larger than the reference distance Lc (step S803; YES), the reproducing unit 204 stops the reproduction of the sound uttered from the sound source 301.

If the calculated distance is equal to or less than the reference distance Lc (step S803; NO), the varying unit 203 determines whether or not the distance between the sound source 301 and the attended point 302 is larger than the predetermined threshold value Lth (step S805).

If the distance is larger than the threshold value Lth (step S805; YES), the varying unit 203 does not vary sound to be uttered from the sound source 301.

On the other hand, if the distance is equal to or less than the threshold value Lth (step S805; NO), the varying unit 203 obtains sound data corresponding to the sound to be uttered from the sound source 301 (step S807).

Further, the varying unit 203 varies volume based on the distance calculated in step S801 (step S808). For example, the varying unit 203 varies the volume to be lowered the more as the distance between the sound source 301 and the attended point 302 is larger.

Then, the reproducing unit 204 reproduces and outputs sound uttered from the sound source 301 (step S809).

Thus, the sound processing apparatus 200 reproduces sound if the sound source 301 is nearer than the predetermined reference distance Lc, and stops the reproduction of the sound if the sound source 301 is further than the predetermined reference distance Lc. This enables the sound processing apparatus 200 to effectively reproduce sound according to the distance between the sound source 301 and the attended point 302 hearing the sound in virtual space. There is no need for the sound processing apparatus 200 to perform the processing of varying sound if the distance between the sound source 301 and the attended point 302 is larger than the predetermined threshold value Lth. Furthermore, the sound processing apparatus 200 does not reproduce the sound if the distance between the sound source 301 and the attended point 302 is larger than the reference distance Lc. As a result, the sound control processing can be simplified greatly.

Embodiment 3

Next, another embodiment of the present invention will be described. In this embodiment, the varying unit 203 varies sound to be uttered from the sound source 301 to a predetermined minimum volume Vmin in a case where the distance between the sound source 301 and the attended point 302 is larger than the above-described predetermined threshold Lth. In addition, other configurations of the sound processing apparatus 200 of this embodiment are the same as those in above described embodiments and their duplicate descriptions are omitted accordingly. Hereinafter, detailed descriptions are provided below.

The storage unit 201 stores a distance range to vary sound to be associated with sound to be uttered from the sound source 301 in the unit of a virtual distance in virtual space. The storage unit 201 stores the information as shown in FIG. 9A. In the case shown in this drawing, the storage unit 201 stores information showing that sound is reproduced when a distance between the sound source 301 (engine of a running vehicle object) and the attended point 302 (user character object hearing the engine sound of the running vehicle object) is in a range of 0 to 100 meters associated with sound to be reproduced. The storage unit 201 stores information showing each individual distance range corresponding to each sound source 310. This drawing is one example of the information to be stored in the storage unit 201 and the information may be changed in any manner for setting.

Alternatively, the storage unit 201 may be configured to store a distance range to vary sound represented in the unit of a virtual distance in virtual space in a manner to be associated with a file name of sound data to be reproduced as shown in FIG. 9B. In the case shown in this drawing, the storage unit 201 stores information showing that sound is reproduced if a distance between the sound source 301 (engine of a running vehicle object) and the attended point 302 (user character object hearing the engine sound of the running vehicle object) is in a range of 0 to 100 meters associated with sound data of a file name "onsei101.wav". Thus, the storage unit 201 may store information individually showing the distance range for each sound data.

Figure 10A:
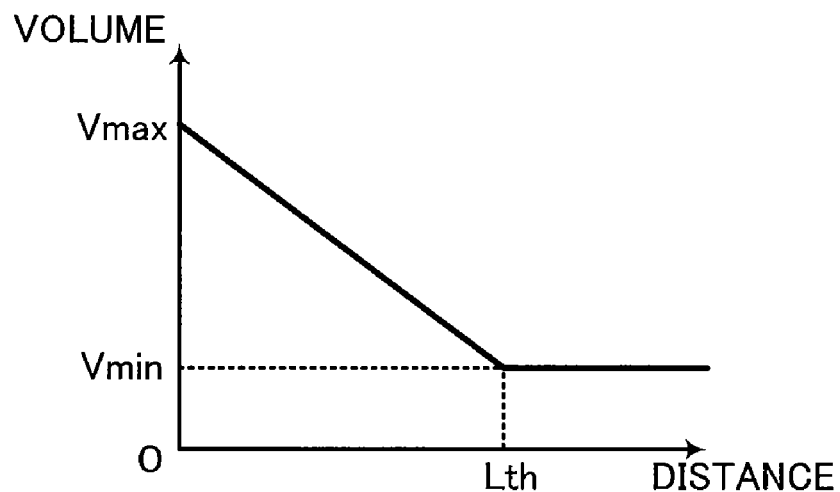
FIG. 10A An exemplary diagram showing a relation among a distance between the sound source and the attended point and the volume of the sound varied by the varying unit according to the embodiment 3.

The varying unit 203 varies the sound uttered from the sound source 301 based on the distance between the sound source 301 calculated by the determination unit 202 and the attended point 302. As shown in FIG. 10A, the varying unit 203 lowers the volume of the sound obtained at the attended point 302 as the distance between the sound source 301 and the attended point 302 is larger. And when the distance between the sound source 301 and the attended point 302 is larger than a predetermined threshold value Lth, the varying unit 203 sets the volume of the sound obtained at the attended point 302 to a predetermined minimum volume Vmin.

Figure 10B:
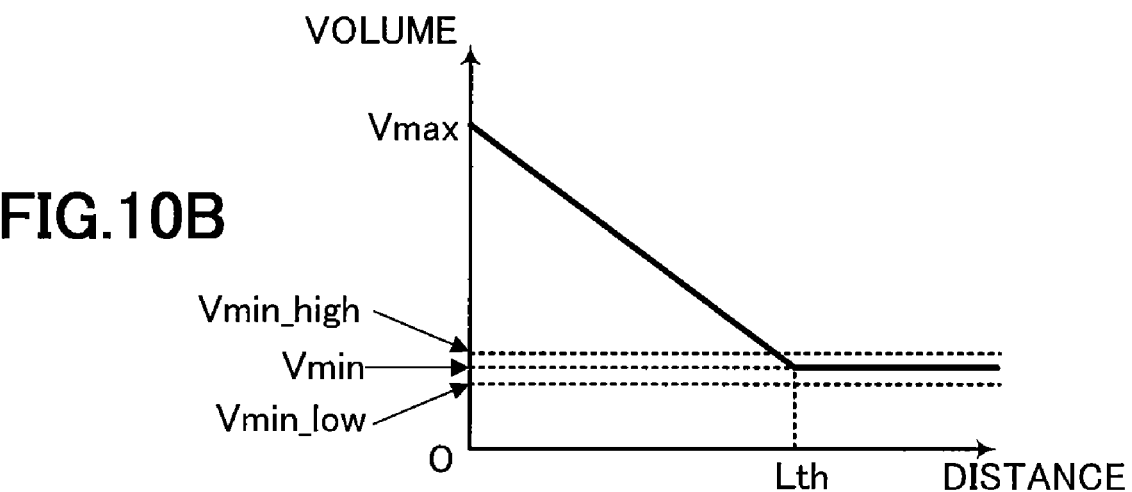
FIG. 10B An exemplary diagram showing a relation among a distance between the sound source and the attended point and the volume of the sound varied by the varying unit according to the embodiment 3.

Alternatively, the varying unit 203 may keep the volume of the sound obtained at the attended point 302 within a predetermined volume range (between Vmin_low and Vmin_high) close to the minimum volume Vmin as shown in FIG. 10B when the distance between the sound source 301 and the attended point 302 is larger than the predetermined threshold value Lth. In addition, in FIG. 10A and FIG. 10B, the change of the volume is shown as a linear change, however, the change of the volume is not limited to those in the drawings.

In this embodiment, unlike in the above embodiments, even when the distance between the sound source 301 and the attended point 302 is larger, the reproduction of the sound by the reproducing unit 204 is not stopped and the sound is reproduced with the volume being at least a predetermined minimum volume or more.

Thus, the sound processing apparatus 200 can reproduce effect sound with the optimum volume without exerting special control on the effect sound in the case where it is necessary that the effect sound is heard by a user from a viewpoint of contrivance even if the distance between the sound source 301 and the attended point 302 is sufficiently large in virtual space. Even if there is a hardware or software limitation on the number of sounds (number of reproducing trucks) that can be reproduced at the same time, effective reproduction of sound is made possible.

The storage unit 201 may store priority of reproduction in a manner to be associated with the sound source 301 in advance. If the priority for the sound source 301 is high, even if the distance between the sound source 301 and the attended point 302 is large, the reproduction does not need to be stopped. For example, in a racing game, by making the priority of engine sound of a vehicle set to be relatively high, even if there is a limitation on the number of reproducing trucks, the erroneous stop of the reproduction of the engine sound does not occur when other effect sound is reproduced.

Further, in the case where there is a plurality of sound sources 301 to which priority of reproduction is assigned in virtual space, a predetermined number (for example, the number of reproduction tracks) of sound sources 301 is extracted in high order of priority from these sound sources 301 and only the sound to be uttered from the extracted sound sources 301 may be varied or reproduced.

In addition, in this embodiment, in the step S604 in FIG. 6 described above, instead of the case where the varying unit 203 keeps volume within a predetermined volume range, the varying unit 203 may make the volume be a predetermined minimum volume. Other steps are the same as those in the above embodiments and details of the flow chart are omitted accordingly.

Embodiment 4

Next, another embodiment of the present invention is described. This embodiment differs from other embodiments in that sound control processing of sound to be uttered from a character object can be managed in a mass. Detailed descriptions are given below.

The storage unit 201 stores information showing a combination of specified character objects.

FIG. 11A shows an example of configurations of the combination of the sound source 301 and possible character object. The set information, typically expressed by numbers, is information to identify the combination, however, any symbol, numeral, and code may be used. The storage unit 201 stores the combination of character objects in a manner to be associated with the set information. In this drawing, for example, the character objects OBJ (2) and OBJ (3) make up one set of the combination. The number of combinations stored in the storage unit 201 or the number of character objects contained in one combination is arbitrary.

FIG. 11B shows an example of a reference distance defining an area to be associated with the sound source 301 which is stored in the storage unit 201. The storage unit 201 stores sound to be uttered from a character object that can possibly serves as a sound source 301, a reference distance defining an area to be associated with the sound source 301, and a predetermined minimum volume in a manner to be associated with one another. For example, for the character objects OBJ (2) and OBJ (3), a common reference distance "D2min≦D≦D2max" is defined. Moreover, for the character objects OBJ (2) and OBJ (3), a common minimum volume V2 is defined.

Thus, in this embodiment, instead of storing the reference distance and minimum volume, for each of sound sources 301, associated with sound source 301, the storage unit 201 stores the reference distance and minimum volume, for each of character objects, associated with character object contained in the combination shown in FIG. 11A is associated with a common reference distance and common minimum volume. This enables a decrease in memory capacity used by the storage unit 201.

In this embodiment, both the reference distance and minimum volume are defined as common data, however, either one of them may be defined as common data.

The determination unit 202, as in the case of each of the above embodiments, calculates the distance between the sound source 301 and the attended point 302 based on coordinates value of the sound source 301 and coordinates value of the attended point 302 and determines whether or not the attended point 302 is contained in the distance range designated by the reference distance stored in the storage unit 201.

The varying unit 203 varies the sound uttered from the sound source 301 based on the calculated distance between the sound source 301 and the attended point 302 by the determination unit 202. That is, at a predetermined timing when effect sound or the like is to be uttered from the sound source 301 during the progress of a game, the varying unit 203 varies the sound to have volume corresponding to a distance calculated by the determination unit 202. Further, if the distance obtained from the calculation is not within a range indicated by a reference distance, the varying unit 203 varies the sound to have a minimum volume stored in the storage unit 201.

Then, the reproducing unit 204 reproduces the sound varied by the varying unit 203.

In the case where there are a vehicle object running in a virtual space and a character object to be loaded on the vehicle object, it is possible to vary both the volume of the sound (for example, engine sound) uttered from the vehicle object and the volume of the sound (for example, sound of gunfire) uttered from the character object loaded on the vehicle object in a mass.

In the case where a plurality of sound sources 301 exists near to one another or where, even if not existing near to one another, a plurality of sound sources 301 exists in a position being the same distance from the attended point 302, by combining, in advance, these sound sources 301 as one set, the volume can be changed similarly.

Thus, a sense of incongruity will not be given to the sound effects because only one of both sounds, which are to be reproduced together, is reproduced. That is, by defining the combination of the sound sources 30, the volume of the sound can be easily increased or decreased, and the reproduction can be stopped or continued.

Embodiment 5

In this embodiment, the embodiments described above are combined.

As shown in FIG. 12A, the storage unit 201 may store a flag which designates whether the reproduction is to be stopped as in the case of the embodiment 2 or the reproduction is to be continued with the minimum volume as in the case of the embodiment 3 when the distance between the sound source 301 and the attended point 302 is larger than a predetermined value.

For example, the flag is set to "0" when control in the embodiment 2 is exerted, and the flag is to "1" when control in the embodiment 3 is exerted. The varying unit 203 and reproducing unit 204 may be so configured as to properly perform the sound control processing depending on the flag value.

As shown in FIG. 12B, the storage unit 201 may store the flag in a manner to be associated with a file name of sound data to be reproduced. Further, as shown in FIG. 12, even when the information to be stored is set by using a distance value Linf being large enough to be able to be substantially considered as infinite as a distance range for reproduction, the storage unit 201 may store the flag in a manner to be associated with a file name of sound data to be reproduced or with the sound source 301.

Thus, the above embodiments may be easily combined. In addition, the sound control processing that can be properly performed by the flag is not limited to the contents of the above embodiments and it is needless to say that the flag can be used properly to combine the above embodiments with other embodiment or any other modified embodiment.

The present invention is not limited to the above embodiments, and various modifications and applications are possible. Additionally, combinations of the above embodiments are possible.

In the above embodiments, the sound source 301 is the moving vehicle object. However, the present invention is not limited thereto and, regardless of whether or not the object itself moves, any character object can be the sound source 301. Moreover, in the above embodiments, the attended point 302 is placed in a place where the user character object is placed, however, the present invention is not limited thereto and the position may be a position of a virtual camera placed in virtual space and the attended point 302 may be the first person view point in virtual space.

In the above embodiments, the varying unit 203 varies volume of sound to be uttered from the sound source 301, however, the present invention is not limited thereto. For example, the varying unit 203 may be configured to perform other sound control including control of an effect of reflecting sound, control of attenuating or amplifying specified frequency components in a case where the attended point 302 exists in an area associated with the sound source 301. This enables the realization of sound effects that can provide more reality.

The varying unit 203 may perform sound control processing by considering eyes direction in the attended point 302 hearing sound in virtual space. For example, in the case where a directional vector toward the sound source 301 from the attended point 302 coincides with the eyes directional vector or is within a predetermined range of the vicinity of the eyes directional vector, the sound to be uttered from the sound source 301 can be varied so that its volume is made high. This enables the realization of contrivance providing more reality achieved by visual effects and sound effects.

Further, the storage unit 201 may set the same priority to specified character objects, and the varying unit 203 may equalize an amount of changes in the sound to be uttered from these character objects in a case where the character objects having the same priority serve as the sound source 301. For example, by setting the same priority to the vehicle object running in virtual space and the character object loaded on the vehicle object, the volume of the sounds uttered from both can be raised or lowered to the same level.

For example, programs to activate the sound processing apparatus 200 as a whole or a part of the device may be saved for distribution in a computer-readable storage medium such as a memory card, CD-ROM, DVD, MO (Magnet Optical disk) or a like or the program may be installed in another computer to be used for execution of above processes.

Moreover, the above program may be stored in a disk device or the like installed in a server device on the Internet and may be superimposed on a carrier wave so as to be downloaded into a computer.

Note that the present application claims priority based on Japanese Patent Application No. 2006-085123, which is herein incorporated by reference.

INDUSTRIAL APPLICABILITY

As described above, according to the present invention, sound can be effectively reproduced according to the distance between the sound source and a position where sounds are heard in virtual space.

The invention claimed is:

1. A sound processing apparatus comprising:
    a storage unit which stores an area associated with a sound source placed in virtual space;
    a determination unit which determines, for the sound source, whether or not an attended point placed in the virtual space is contained in the area stored in the storage unit;
    a varying unit which varies sound to be uttered from the sound source in accordance with a distance between the sound source and the attended point when the attended point is determined as being contained in the area by the determination unit, and which sets the sound to a minimum value when the attended point is determined as being outside of the area by the determined unit; and
    a reproducing unit which reproduces the sound varied by the varying unit.

2. A sound processing apparatus comprising:
    a storage unit which stores, for each of a plurality of sound sources placed in virtual space, a position of the sound source, a reference distance defining an area associated with the sound source, and a minimum volume of sound to be uttered from the sound source, and stores a position of an attended point placed in the virtual space;
    a determination unit which, for each of the plurality of sound sources, calculates a distance between the sound source and the attended point in accordance with the position of the sound source and the position of the attended point stored in the storage unit, and determines whether or not the attended point is contained in an area associated with the sound source based on whether or not the calculated distance is smaller than the reference distance of the sound source;
    a varying unit which varies volume of sound to be uttered from the sound source into one that is correlated in advance such that the larger the distance between the sound source and the attended point is, the smaller the volume of the sound is, when the attended point is determined by the determination unit as being contained in the area, and varies the volume of the sound so as to be the minimum volume when the attended point is determined as being not contained; and
    a reproducing unit which reproduces the sound varied by the varying unit.

3. The sound processing apparatus according to claim 1, wherein
    the storage unit further stores information designating a combination of a plurality of sound sources, and
    the varying unit varies respective volumes of respective sounds to be uttered from the sound sources designated by the combination, in parallel with each other.

4. A sound processing method to be performed by a sound processing apparatus having a storage unit which stores an area associated with a sound source placed in virtual space, the sound processing method comprising the steps of:
    a determination step of determining, for the sound source, whether or not an attended point placed in the virtual space is contained in the area stored in the storage unit;
    a varying step of varying sound to be uttered from the sound source in accordance with the distance between the sound source and the attended point, when the attended point is determined by the determination step as being contained in the area, the carrying sound to be uttered from the sound source being set to a minimum value when the attended point is determined by the determination step as being outside of the area; and
    a reproducing step of reproducing the sound varied by the varying step.

5. A sound processing method to be performed by a sound processing apparatus having a storage unit which stores, for each of a plurality of sound sources placed in virtual space, a position of the sound source, a reference distance defining an area associated with the sound source, and a minimum volume of sound to be uttered from the sound source and stores a position of an attended point placed in the virtual space, the sound processing method comprising the steps of:
    a determination step of, for each of the plurality of sound sources, calculating a distance between the sound source and the attended point in accordance with the position of the sound source and the position of the attended point stored in the storage unit, and determining whether or not the attended point is contained in the area associated with the sound source based on whether or not the calculated distance is smaller than the reference distance of the sound source;
    a varying step of varying volume of sound to be uttered from the sound source into one that is correlated in advance such that the larger the distance between the sound source and the attended point is, the smaller the volume of the sound is, when the attended point is determined by the determination step as being contained in the area, and varying the volume of the sound so as to be the minimum volume when the attended point is determined as being not contained; and
    a reproducing step of reproducing the sound varied by the varying step.

6. A computer-readable information recording medium on which is recorded a program for controlling a computer to function as:
    a storage unit which stores an area associated with a sound source placed in virtual space;
    a determination unit which determines, for the sound source, whether or not an attended point placed in the virtual space is contained in the area stored in the storage unit;
    a varying unit which varies sound to be uttered from the sound source in accordance with a distance between the sound source and the attended point when the attended point is determined as being contained in the area by the determination unit, and which sets the sound to a minimum value when the attended point is determined as being outside of the area by the determined unit; and
    a reproducing unit which reproduces the sound varied by the varying unit.

7. A computer-readable information recording medium on which is recorded a program for controlling a computer to function as:
    a storage unit which stores, for each of a plurality of sound sources placed in virtual space, a position of the sound source, a reference distance defining an area associated with the sound source, and a minimum volume of sound to be uttered from the sound source, and stores a position of an attended point placed in the virtual space;

a determination unit which, for each of the plurality of sound sources, calculates a distance between the sound source and the attended point in accordance with the position of the sound source and the position of the attended point stored in the storage unit, and determines whether or not the attended point is contained in an area associated with the sound source based on whether or not the calculated distance is smaller than the reference distance of the sound source;

a varying unit which varies volume of sound to be uttered from the sound source into one that is correlated in advance such that the larger the distance between the sound source and the attended point is, the smaller the volume of the sound is, when the attended point is determined by the determination unit as being contained in the area, and varies the volume of the sound so as to be the minimum volume when the attended point is determined as being not contained; and a reproducing unit which reproduces the sound varied by the varying unit.

8. A program for controlling a computer to function as:

a storage unit which stores an area associated with a sound source placed in virtual space;

a determination unit which determines, for the sound source, whether or not an attended point placed in the virtual space is contained in the area stored in the storage unit;

a varying unit which varies sound to be uttered from the sound source in accordance with a distance between the sound source and the attended point when the attended point is determined as being contained in the area by the determination unit, the sound to be uttered from the sound source being set to a minimum value when the attended point is determined by the determination unit as being outside of the area; and a reproducing unit which reproduces the sound varied by the varying unit.

9. A program for controlling a computer to function as:

a storage unit which stores, for each of a plurality of sound sources placed in virtual space, a position of the sound source, a reference distance defining an area associated with the sound source, and a minimum volume of sound to be uttered from the sound source, and stores a position of an attended point placed in the virtual space;

a determination unit which, for each of the plurality of sound sources, calculates a distance between the sound source and the attended point in accordance with the position of the sound source and the position of the attended point stored in the storage unit, and determines whether or not the attended point is contained in an area associated with the sound source based on whether or not the calculated distance is smaller than the reference distance of the sound source;

a varying unit which varies volume of sound to be uttered from the sound source into one that is correlated in advance such that the larger the distance between the sound source and the attended point is, the smaller the volume of the sound is, when the attended point is determined by the determination unit as being contained in the area, and varies the volume of the sound so as to be the minimum volume when the attended point is determined as being not contained; and a reproducing unit which reproduces the sound varied by the varying unit.

* * * * *